(12) United States Patent
Soler Turu et al.

(10) Patent No.: US 7,909,980 B2
(45) Date of Patent: Mar. 22, 2011

(54) PROCESS FOR THE PRODUCTION OF HYDROGEN

(75) Inventors: Lluis Soler Turu, Viladecavalls (ES); Maria Muñoz Tapia, Terrassa (ES); Juan Casado Gimenez, Barbera del Valles (ES); Jorge Macanas De Benito, Sabadell (ES)

(73) Assignee: Matgas 2000, A.I.E., Bellaterra (ES)

( * ) Notice: Subject to any disclaimer, the term of this patent is extended or adjusted under 35 U.S.C. 154(b) by 1154 days.

(21) Appl. No.: 11/148,521

(22) Filed: Jun. 9, 2005

(65) Prior Publication Data

US 2005/0274623 A1 Dec. 15, 2005

(30) Foreign Application Priority Data

Jun. 11, 2004 (EP) .................................... 04380126

(51) Int. Cl.
 *C25B 1/10* (2006.01)
(52) U.S. Cl. ....................................... 205/637; 205/628
(58) Field of Classification Search .................. 205/628, 205/637
 See application file for complete search history.

(56) References Cited

U.S. PATENT DOCUMENTS

| | | | | |
|---|---|---|---|---|
| 4,699,700 | A | 10/1987 | Dhooge | 204/105 |
| 5,271,813 | A * | 12/1993 | Linkous | 205/628 |
| 6,063,258 | A * | 5/2000 | Sayama et al. | 205/637 |
| 6,224,744 | B1 * | 5/2001 | Casado Gimenez et al. | 205/756 |
| 2003/0031585 | A1 | 2/2003 | Puma | 422/23 |
| 2006/0144700 | A1 * | 7/2006 | Carson et al. | 204/252 |

FOREIGN PATENT DOCUMENTS

EP 0931855 7/1999

OTHER PUBLICATIONS

Andreozzi et al., "Advanced oxidation processes (AOP) for water purfication and recovery," Catalysis Today 53 (1999) pp. 51-59.*
Takehara et al. "Hydrogen Production by Hybrid Electrolysis Combined With Assistance of Solar Energy". STN Chemical Abstracts, XX, XX, vol. 22, No. 95, Nov. 30, 1981, XP002095242.
Yoshizawa et al. "Electrochemical Hydrogen Generator". STN Chemical Abstracts, XX, XX, vol. 12, No. 89, Sep. 18, 1978, XP002095241.
Takehara et al. "Hydrogen Production by Hybrid Process Combined With Assistance of Solar and Electrical Energies". Chemical Abstracts + Indexes, American Chemical Society. Columbus, US, vol. 18, No. 98, May 2, 1983, XP002095243.

* cited by examiner

*Primary Examiner* — Alexa D. Neckel
*Assistant Examiner* — Nicholas A. Smith
(74) *Attorney, Agent, or Firm* — Cozen O'Connor

(57) ABSTRACT

Process for production of hydrogen of high purity by photo-electrochemical means with low energy consumption. The process is carried out in an electrochemical cell which comprises at least one anodic chamber with an anode and at least one cathodic chamber with a cathode, in which the two chambers are separated by an ion-exchange membrane, where: i) the anodic chamber contains an aqueous anodic solution which comprises the $Fe^{2+}$ion, and the aqueous solution is adjusted to a pH less than or equal to 5; ii) a sacrificial substance is added to the anodic chamber; iii) the anodic solution is irradiated with ultraviolet light and/or visible light; iv) the cathodic chamber contains an aqueous cathodic solution which has a proton concentration equal to or higher than $10^{-3}$ M; and v) electric current is fed between the anodic chamber and the cathodic chamber separated by the membrane, this membrane being a proton-selective ion-exchange membrane impermeable to the iron and impermeable to the sacrificial substance.

10 Claims, 2 Drawing Sheets

PROCESS FOR THE PRODUCTION OF HYDROGEN

FIELD OF THE INVENTION

This invention relates to a new process for producing high-purity hydrogen by photoelectrochemical means with low energy consumption.

BACKGROUND OF THE INVENTION

Hydrogen is the simplest known element. A hydrogen atom has only one proton and one electron. It is the most abundant gas in the Universe and accounts for over thirty per cent of the mass of the Sun. The Sun is basically composed of hydrogen and helium. In nuclear fusion, four nuclei of the hydrogen combine to form one nucleus of helium, releasing a large amount of energy.

Under normal conditions, pure hydrogen is a gas made up of diatomic molecules ($H_2$). This gas is not found in large amounts in free form on Earth, however. Despite being one of the most abundant elements on the Earth's surface, it is usually found combined with other elements. Combined with oxygen it produces water ($H_2O$), with carbon yields hydrocarbons such as methane ($CH_4$) or mixtures such as petroleum.

Hydrogen is one of the most promising alternative fuels, because of its high efficiency and low pollution. It can be used for locomotion, heat-generation and in electricity generators (fuel cells) in places not covered by the electricity grid.

Hydrogen can be obtained by various methods. Most of the processes used nowadays to produce hydrogen are based on the use of fossil fuels, while only seven per cent comes from renewable energy sources. Industrial concerns produce the hydrogen they require by a process called "steam reforming". The high temperatures of the steam split the hydrogen-carbon bonds in natural gas ($CH_4$). This is the most effective way to produce hydrogen, but does require fossil fuels as energy and heat source. This process is therefore not currently profitable for producing hydrogen and at the same time using it as a fuel. Nor is it environmentally sustainable, since the resulting emissions of $CO_2$ into the atmosphere increase the greenhouse effect and the climate change associated with it.

Another way to make hydrogen is by means of electrolysis of water. This consists in separating the water into its basic elements, hydrogen and oxygen, by passing an electric current ($2H_2O$+electricity $\rightarrow 2H_2+O_2$) through it. The standard electrolytic-cell thermodynamic potential for producing hydrogen by electrolysis of water is 1.24 V. However, the operating potential applied in industry for such electrolysis is around 2 V.

The hydrogen produced by electrolysis is very pure. Hydrogen obtained by electrolysis of water is nevertheless at present more expensive than that obtained from natural gas. There have obviously been attempts to improve electrolytic technology in order to reduce the working voltage and, therefore, the production costs. A research line tried was that of using light to provide some of the energy needed for the electrolysis. The resulting process is known as photoelectrolysis. One recent example of application is disclosed in U.S. Pat. No. 6,063,258 (16 May 2000). This patent describes irradiation with a high-pressure mercury lamp of an electrolytic solution containing ferric ions and a semiconductor photocatalyst in suspension based on solid particles of $WO_3$, in order to reduce the ferric ions to ferrous ions. In a subsequent stage, the resulting solution is electrolysed by conventional means to produce hydrogen. Although this allows the voltage applied in the final phase to be decreased, the problem with this procedure is that the currents obtained are very low (less than 1 mA) and the corresponding hydrogen yields measured are only micromoles per hour. The reason for this is that very low concentrations of iron in solution (<1 mM) were used, since increasing the concentration of ferrous ions led to them being reoxidised to ferric ions on the surface of the $WO_3$, thereby wasting most of the incident light energy. Furthermore, $WO_3$ is not an efficient catalyst to capture solar light, which is the preferred source in such applications because it is free, accessible and inexhaustible. That was why a lamp with a high proportion of UV light was used. Both factors nevertheless make this process unviable on an industrial scale.

Another patent that forms part of the state of the art is U.S. Pat. No. 6,368,492 (9 Apr. 2002). This discloses an appliance for generating hydrogen by electrolysis of an aqueous solution of an organic fuel, such as methanol. The electrolyte is a solid-state polymer membrane such as those normally used in fuel cells. Anodic oxidation of methanol calls for lower potential than that of water, thus saving much of the electrical energy needed. The device nevertheless produces $CO_2$ as a residue, and one wonders why the methanol is not simply used directly as a fuel in a conventional engine or in a fuel cell instead of converting it into hydrogen which, in the vast majority of energy applications, will in turn end up being burned.

There are other procedures for producing hydrogen, but either they do not permit high-purity hydrogen to be obtained at low cost or they are based on producing hydrogen from fossil fuels. No method of general application yet exists, therefore, for producing high-purity hydrogen that is industrially profitable but not based on the use of fossil fuels.

BRIEF DESCRIPTION OF THE INVENTION

This invention discloses a process for producing hydrogen of high purity, using electricity, by photoelectrochemical means and with energy consumption lower than is used for producing hydrogen by conventional electrolysis of water.

In accordance with the first aspect of the invention a process is disclosed for producing high-purity hydrogen by electrochemical means with a major saving of consumption of the energy used in said process, which saving can amount to a minimum reduction of 20%, though is more usually 40% or even more of the energy cost involved in producing hydrogen by electrolysis of water.

In accordance with the first aspect, a process is provided for producing hydrogen by electrochemical means in a cell which comprises at least one anodic chamber with an anode and at least one cathodic chamber with a cathode, in which the two chambers are separated by an ion-exchange membrane, characterised in that:

i) said anodic chamber contains an aqueous anodic solution which comprises the $Fe^{2+}$ ion and this aqueous solution is adjusted to a pH less than or equal to 5, preferably lower than 4, and more preferably still, lower than 3;

ii) a sacrificial substance is added to said anodic chamber;

iii) the anodic solution is irradiated with ultraviolet light and/or visible light;

iv) the cathodic chamber contains an aqueous cathodic solution which has a proton concentration equal to or exceeding $10^{-3}$ M; and v) electric current is fed between the anodic chamber and the cathodic chamber separated by said membrane, which membrane is a proton-selective ion-exchange membrane impermeable to iron and to the sacrificial substance.

One advantage of using a sacrificial substance and then irradiating the anodic solution containing said substance with ultraviolet light and/or visible light lies in the fact that this achieves a higher current flow between the anodic chamber and the cathodic chamber, without altering the potential applied between the anode and the cathode, or, in other words, a global reduction in the energy consumption of the electrochemical process is achieved.

Advantageously, the fact of using a sacrificial substance and the subsequent irradiation of said solution means that, simultaneously with the production of hydrogen of high purity, degradation of the substances used as sacrificial substances takes place.

Advantageously, the process for producing hydrogen in accordance with the first aspect of the invention achieves a reduction of the electrolytic-cell thermodynamic potential for producing hydrogen by electrochemical means, from 1.24 V (in electrolysis of water) to 0.77 V (in this process), or, in other words, a reduction is achieved in the operating potential used to produce hydrogen by electrochemical means, from about 2.0 V to 1.2 V, which permits a proportional reduction in the electrical consumption of the electrochemical process.

FIGURES

DEFINITIONS

Figure 1:
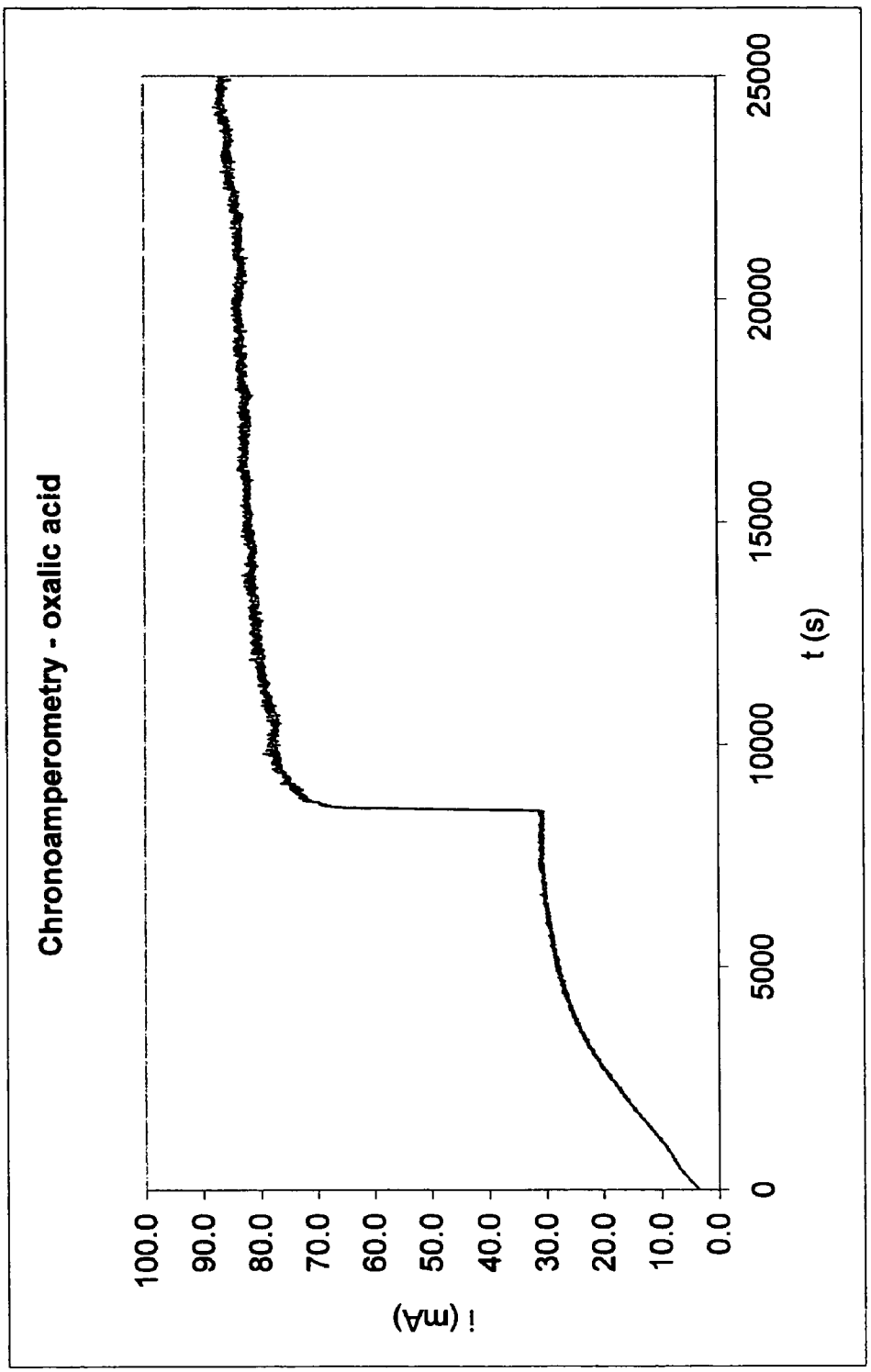
FIG. 1 shows the evolution of current intensity (mA) in relation to time (s) in an example which has had oxalic acid added as sacrificial substance in the anodic chamber.

In this invention "sacrificial substance" is taken to mean any element or chemical compound, organic or inorganic, or mixture thereof, such as wastewater, which is consumed during the reactions which take place in the anodic chamber.

In this invention "proton-selective ion-exchange membrane, impermeable to iron and to the sacrificial substance" is taken to mean a membrane with an $Fe^{(2+/3+)}/H^+$ factor of <0.05, and preferably less than 0.01, and still more preferably less than 0.001, such that at the end of the experiment no concentrations of the sacrificial substance remain in the cathodic chamber that are detectable by the conventional analytical methods.

In this invention, "acid conditions" are taken to mean a proton concentration greater than $10^{-7}$M.

In this invention, "electrolytic-cell thermodynamic potential" is taken to mean the algebraic sum of thermodynamic potentials of the oxidation semi-reaction at the anode and the reduction reaction at the cathode. This electrolytic-cell thermodynamic potential is always a lower value than the electrolytic-cell operating potential used in an industrial-scale procedure.

In this invention, "irradiation of the anodic solution with ultraviolet light and/or visible light" is taken to mean irradiation of the anodic chamber so as to give rise to photoreduction of the $Fe^{3+}$ cation.

In this invention, "addition of an ionic salt in the cathodic chamber" is taken to mean adding an ionic compound that does not take part in the chemical reactions involved in the process.

DETAILED DESCRIPTION OF THE INVENTION

There follows in this invention a more detailed description with reference to the examples included.

The objective of the process of this invention is to produce hydrogen of high purity based on the following photoelectrochemical redox reactions.

The hydrogen is produced at the cathode:

Cathode: $H^+ + e^- \rightarrow \tfrac{1}{2}H_2$ (1)

The iron (II) is oxidised to iron (III) at the anode:

Anode: $Fe^{2+} \rightarrow Fe^{3+} + e^-$ (2)

Sacrificial substances are used in the presence of ultraviolet and/or visible light and $Fe^{3+}$ ions to recover the $Fe^{2+}$ oxidised at the anode in accordance with the following sequence:

Sequence of Reactions

$Fe^{3+} + H_2O + h\nu \rightarrow Fe^{2+} + OH\cdot + H^+$ (3)

$R + OH\cdot \rightarrow \cdot ROH$ (4)

$\cdot ROH + OH\cdot \rightarrow R=O + H_2O$ (5)

$R=O + OH\cdot \rightarrow \rightarrow CO_2 + H_2O$ (6)

in which R represents a sacrificial organic molecule which is oxidised in successive steps to $CO_2$ and $H_2O$.

The process proposed by the inventors reduces the electrolytic-cell thermodynamic potential of hydrogen by electrolysis of water, which means lower energy consumption in the electrochemical process.

In accordance with the first aspect of the invention a procedure is carried out for producing hydrogen by electrochemical means. The hydrogen is produced at the cathode and the $Fe^{2+}$ is oxidised to $Fe^{3+}$ at the anode. In the presence of aqueous $Fe^{3+}$, sacrificial substances and ultraviolet and/or visible light a Photo-Fenton like reaction can be achieved in the absence of hydrogen peroxide, which produces OH. radicals and permits recovery of the $Fe^{2+}$, thus closing the catalytic cycle (see reaction (3)). These radicals can oxidise the sacrificial substances. Protons are produced at the same time and migrate through the ion-exchange membrane to replace those consumed in the cathodic reaction to generate hydrogen.

Non-restrictive examples of sacrificial substances that increase the production of hydrogen in accordance with the procedure of this invention are: ethanol, oxalic acid, aniline, acetic acid, formic acid, acetone and/or benzaldehyde.

There follows a brief description of the Fenton reaction and the Photo-Fenton process.

The Fenton reaction is defined as the catalytic generation of hydroxyl radicals based on reaction between the ferrous ion and hydrogen peroxide, although this reaction can also be initiated by the presence of ferric ions:

Fenton:

$Fe^{3+} + H_2O_2 \rightarrow Fe^{2+} HO_2\cdot + H^+$ (7)

$Fe^{2+} + H_2O_2 \rightarrow Fe^{3+} + HO\cdot + OH^-$ (8)

The generated hydroxyl radicals oxidise a wide variety of organic and inorganic molecules, and can even achieve complete mineralisation of the sacrificial substance. This is why this process has been used in recent years for the decontamination of wastewaters and industrial effluents. In Fenton processes the oxidising power can be boosted by the application of ultraviolet and/or visible light (Photo-Fenton process), due to photoreduction of ferric ion taking place in aqueous medium (reaction 3), thus increasing the concentration of hydroxyl radicals.

The species generated thereby are capable of oxidising many sacrificial substances, as shown in the schema of reactions described above.

Such reactions are more effective under acidic conditions (pH≈3).

The Fenton reaction is therefore used for decontamination of industrial waters and effluents containing oxidisable contaminants, and the utilisation of ultraviolet and/or visible light (Photo-Fenton process) increases the oxidising power of the solution due to the increased concentration of hydroxyl radicals, while it photoreduces the ferric ion and thus permits a new Fenton reaction cycle with consumption of hydrogen peroxide.

In the process of production of hydrogen in accordance with the first aspect of the invention, the utilisation of ultraviolet and/or visible light has the purpose of recovering the $Fe^{2+}$ and closing the cycle so that there can arise a further oxidation of the $Fe^{2+}$ to $Fe^{3+}$ by electrochemical means.

Advantageously, the utilisation of solar light as the source of ultraviolet/visible light brings a saving in this process, due to the fact that solar light is a free source of ultraviolet/visible light.

Advantageously, the addition of an ionic salt to the cathodic chamber allows the conductivity of the solutions to be increased, thereby giving rise to a greater current between the anode and the cathode and, therefore, a saving of the energy consumed in the electrochemical process.

The ionic salt must not be oxidised or reduced in the cathodic solution. Any salt that meets this condition can be used in the process of production of hydrogen defined in claim 1. Said salt is preferably sodium sulphate or potassium sulphate.

In the process of production of hydrogen in accordance with the first aspect of the invention, the utilisation of at least one cathode and at least one anode is necessary so that the electrochemical reactions that permit the generation of hydrogen can take place.

Advantageously, the material of the anode and the cathode can be stainless steel mesh, a material that is not expensive to acquire. However, materials chosen from among silver, platinum, platinised titanium, nickel or DSA® electrodes can also be used.

Determining the Membrane

In order to determine which type of membranes fits the necessary requirements for the hydrogen production process of the invention, a test to permit their selection is included below. Other equivalent tests can nevertheless be used as long as they are suitable for determining suitable membranes for use in the process of the invention.

Test for Selectivity for Protons:

The membrane to be determined is placed in a cell which comprises an anodic chamber with an anode and a cathodic chamber with a cathode, in which the two chambers are separated by said membrane. The aqueous solution of the anodic chamber will be 0.01M ferrous sulphate diluted in 0.01M sulphuric acid. The aqueous solution of the cathodic chamber will be 0.01M sulphuric acid. A constant current of 10 mA is applied for three hours between cathode and anode, and cathodic solution samples are taken at the start time and every 30 minutes until the end of the test. The total iron of all the samples is then analysed by any conventional method. On the basis of the current strength applied during the test we can find the total protons that should have been transported through the membrane, by applying Faraday's law. Analysis of the total iron can be used to calculate the amount of protons actually transported through the membrane. Finally, the moles of iron cations transported is divided by the proton moles transported in order to determine the $Fe^{(2+/3+)}/H^+$ ratio, and a suitable membrane for use in the hydrogen production process defined in claim 1 will be one with a ratio of less than 0.05, preferably less than 0.01 and more preferably still of less than 0.001.

Membranes useful for hydrogen production process according to the first aspect of the invention can be synthesised membranes, commercially available membranes or chemically modified membranes.

Synthesised membrane is taken to mean a laboratory-prepared polymer matrix membrane that permits proton exchange between the two chambers, such as a membrane based on sulphonated poly(etheretherketone) (SPEEK). The commercially available membranes useful for the process of the invention are chosen from among ion-exchange membranes, such as those supplied by Asahi Kasei, Eurodia (Neosepta), Sybronchemical or Fuma-Tech which are selective for monovalent cations and especially protons. Chemically modified commercial membranes are taken to mean ion-exchange membranes available commercially, such as Nafion, which have been treated with a reagent or coated with a positively charged polymer to improve their selectivity for protons as against other metallic cations.

Any membranes that a person skilled in the art finds fulfil the requirements of selectivity and non-permeability to iron can nevertheless be used in the hydrogen production process defined in claim 1.

Conventional methods can be used to determine the permeability of the membrane to the sacrificial substance, such as direct analysis for the presence of the sacrificial substance in the cathodic chamber.

EXAMPLES

Example 1

Effect of the addition of oxalic acid on hydrogen production.

Test Conditions

A Pyrex glass cell with two chambers each of 275 ml capacity was used, together with a PC-controlled PAR 263A potentiostat, with two stainless steel meshes as cathode and anode. The meshes were of circular shape with a diameter of 3.5 cm and mesh size of 1.5 mm, while the mesh wire had a thickness of 0.4 mm.

In this test a Neosepta CMX-S membrane was used, and in all the examples the anodic chamber was supplied with light by a 1000 W halogen light from General Electric, model K4/Q1000 T3/C.

In order to quantify the amount of hydrogen produced at the cathode on the basis of current strength, a flow of $N_2$(gas) was made to pass through the aqueous cathodic solution in order to prevent secondary reactions such as the reduction of dissolved atmospheric oxygen.

The cathodic and anodic reactions are described above under references (1) and (2), respectively.

Initial Conditions

The aqueous anodic solution was made up of 30.58 g of $FeSO_4.7H_2O$ and 7.75 g of $Fe_2(SO_4)_3.9H_2O$ diluted in 275 ml of 0.01M $H_2SO_4$ with an initial pH of pH=1.6 and a steady temperature of 75° C. (heating produced by the lamp).

The aqueous cathodic solution was made up of 275 ml of 1M $H_2SO_4$ with an initial pH of pH=0.0 and temperature of 65° C.

The experimental technique was chronoamperometry in potentiostatic mode with a steady voltage of 1.20 V between anode and cathode.

Once 8,500 seconds had elapsed from the start of the test 4.16 g of oxalic acid was added to the anodic solution.

At the end of the test, the pH readings of the anode and cathodic chambers were 0.8 and 0.1, respectively.

On the basis of the results set out in FIG. 1, it is found that following addition of oxalic acid a rapid increase of current intensity is observed and the current remains stable for up to 16,500 seconds. In accordance with Faraday's law, that current is directly related with the flow of hydrogen obtained.

Example 2

Effect of the addition of aniline on hydrogen production.
Test Conditions

The same conditions were employed as in example 1, except that a methacrylate cell with two compartments each of 200 ml capacity was used together with a stainless steel mesh of circular shape with a diameter of 3.5 cm and mesh size of 1 mm as anode, in which the mesh wire thickness was 0.3 mm.
Initial Conditions The aqueous anodic solution was made up of 22.08 g of $FeSO_4.7H_2O$ and 5.31 g of $Fe_2(SO_4)_3.9H_2O$ diluted in 200 ml of 0.01M $H_2SO_4$ with an initial pH of pH=1.4 and temperature of 65° C.

The aqueous cathodic solution was made up of 200 ml of 1M $H_2SO_4$ with an initial pH of pH=−0.2 and temperature of 61° C.

The experimental technique was chronoamperometry in potentiostatic mode with 1.20 V between anode and cathode.

Once 12,480 seconds had elapsed from the start of the test, 2.6 g of aniline was added to the anodic solution. A further 2.6 g of aniline was added to the anodic solution at 17,040 seconds.

During the test, small amounts of distilled water were added to the aqueous solutions of the anode and cathodic chambers in order to counteract the evaporation induced by the heat emitted by the lamp. These additions are shown in the table below.

| Anodic solution | | Cathodic solution | |
|---|---|---|---|
| Time (s) | Additions of water (ml) | Time (s) | Additions of water (ml) |
| 5340 | 2.0 | 9420 | 2.0 |
| 9360 | 2.0 | 16200 | 2.5 |
| 9480 | 2.0 | 16440 | 2.5 |
| 10260 | 2.0 | 16560 | 2.5 |
| 16020 | 2.0 | | |
| 16140 | 2.0 | | |
| 16320 | 2.5 | | |
| 16380 | 2.5 | | |
| 16500 | 2.5 | | |

The final pH values of the anode and cathodic solutions were 2.1 and 0.0 respectively.

Figure 2:
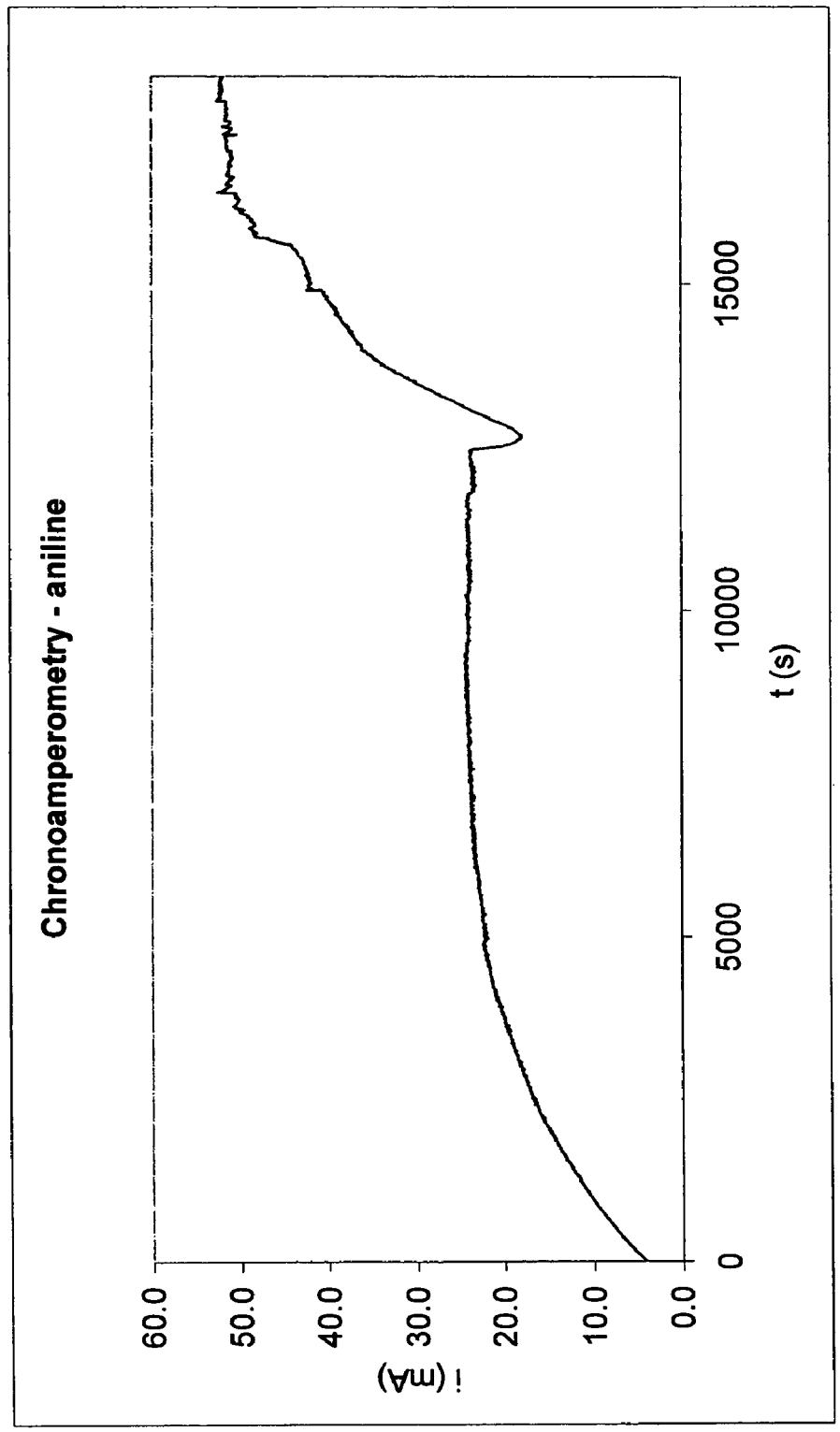
FIG. 2 shows the evolution of current intensity (mA) in relation to time (s) in an example which has had aniline added as sacrificial substance in the anodic chamber.

On the basis of the results shown in FIG. 2, it is found that the addition of aniline to the anodic chamber has a positive effect on the production of hydrogen, for there is an increase in the current flow and in hydrogen evolution.

The current densities obtained in these experiments show that they are viable on an industrial scale.

The invention claimed is:

1. A hydrogen production process by electrochemical means in a cell which comprises at least one anodic chamber with an anode and at least one cathodic chamber with a cathode, in which the two chambers are separated by an ion-exchange membrane, characterized in that: i) said anodic chamber contains an aqueous anodic solution which comprises the $Fe^{+2}$ ion, and this aqueous solution is adjusted to a pH less than or equal to 5; ii) a sacrificial substance which is consumed by electrochemical oxidation selected from ethanol, oxalic acid, acetic acid, formic acid, acetone, benzaldehyde and aniline, or mixtures thereof is added to said anodic chamber; iii) the anodic solution is irradiated with ultraviolet light and/or visible light in said anodic chamber; iv) the cathodic chamber contains an aqueous cathodic solution which has a proton concentration equal to or exceeding $10^{-3}$ M; and v) electric current is fed between the anodic chamber and the cathodic chamber separated by said membrane, which membrane is a proton-selective ion-exchange membrane impermeable to the iron and to the sacrificial substance, wherein the proton-selective ion-exchange membrane has a $Fe^{(2+/3+)}/H^+$ factor of less than 0.05, and wherein the following reactions (2) - (6) take place in said anodic chamber: Cathode: $H^+ + e^- \rightarrow \frac{1}{2} H_2$ (1) Anode: $Fe^{2+} \rightarrow Fe^{3+} + e^-$ (2) $Fe^{3+} + H_2O + h\nu \rightarrow Fe^{2+} + OH\cdot + H^+$ (3) R + OH·→·ROH (4) ·ROH + OH·→R=O+$H_2O$ (5) R=O+OH·→→$CO_2$+$H_2O$ (6) in which R represents the sacrificial substance which is oxidized in successive steps to $CO_2$ and $H_2O$.

2. The process according to claim 1, wherein, in said anodic chamber, said aqueous anodic solution is adjusted to a pH lower than 2.

3. The process according to claim 2, wherein said solution is adjusted to a pH lower than 1.

4. The process according to claim 1, wherein said aqueous cathodic solution has a proton concentration exceeding $10^{-1}$ M.

5. The process according to claim 4, wherein said cathodic solution has a proton concentration exceeding 1 M.

6. The process according to claim 1, wherein said membrane is selected from among membranes based on sulphonated poly(etheretherketone) SPEEK.

7. The process according to claim 1, wherein an inert salt is added to said cathodic chamber.

8. The process according to claim 7, wherein said inert salt is selected from between potassium sulphate or sodium sulphate.

9. The process according to claim 1, wherein said irradiation is carried out with solar light.

10. The process according to claim 1, wherein said sacrificial substance comes from or is contained in a wastewater.

* * * * *